(12) United States Patent
Rhodes et al.

(10) Patent No.: US 9,527,400 B2
(45) Date of Patent: Dec. 27, 2016

(54) SMART ENERGY MANAGEMENT TO IMPROVE ELECTRIFIED VEHICLE BATTERY LIFE

(71) Applicant: Ford Global Technologies, LLC, Dearborn, MI (US)

(72) Inventors: Kevin James Rhodes, Dearborn, MI (US); Andrew Robert Drews, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 8 days.

(21) Appl. No.: 14/609,730

(22) Filed: Jan. 30, 2015

(65) Prior Publication Data
US 2016/0221456 A1    Aug. 4, 2016

(51) Int. Cl.
*B60L 11/18* (2006.01)
*B60L 1/00* (2006.01)
(Continued)

(52) U.S. Cl.
CPC ............ *B60L 11/1862* (2013.01); *B60L 1/003* (2013.01); *B60L 1/02* (2013.01); *B60L 3/0046* (2013.01); *B60L 3/12* (2013.01); *B60L 11/14* (2013.01); *B60L 11/1816* (2013.01); *B60L 11/1842* (2013.01); *B60L 11/1844* (2013.01); *B60L 11/1846* (2013.01); *B60L 11/1857* (2013.01); *B60L 11/1864* (2013.01); *B60L 11/1868* (2013.01); *B60L 11/1877* (2013.01); *B60L 15/2045* (2013.01); *B60L 2210/10* (2013.01); *B60L 2210/30* (2013.01); *B60L 2210/40* (2013.01); *B60L 2240/34* (2013.01); *B60L 2240/36* (2013.01); *B60L 2240/441* (2013.01); *B60L 2240/545* (2013.01); *B60L 2240/547* (2013.01); *B60L 2240/549* (2013.01); *B60L 2240/622* (2013.01); *B60L 2240/72* (2013.01); *B60L 2240/80* (2013.01);
(Continued)

(58) Field of Classification Search
CPC ......................... B60L 11/1838; B60L 11/1809
See application file for complete search history.

(56) References Cited

U.S. PATENT DOCUMENTS

| 5,565,759 A | 10/1996 | Dunstan |
|---|---|---|
| 2005/0077877 A1 | 4/2005 | Cawthorne |

(Continued)

*Primary Examiner* — Thomas Tarcza
*Assistant Examiner* — Garrett Evans
(74) *Attorney, Agent, or Firm* — David B. Kelley; Brooks Kushman P.C.

(57) ABSTRACT

A battery charging system includes a charger that is configured to charge and discharge a battery. The battery system further includes a controller programmed to operate the charger based on a state of charge of the battery to, during a storage duration, maintain the state of charge at a partial charge level. The charger may be operated to charge and discharge the battery during the storage duration. Upon expiration of the storage duration, the controller operates the charger to maintain the state of charge at an operating charge level. The partial charge level is selected to reduce an amount of degradation to the battery relative to the operating charge level for a same duration of time. The battery charging system includes remote connectivity such that the storage duration may be modified during the storage duration from a remote device.

19 Claims, 4 Drawing Sheets

(51) Int. Cl.
*B60L 1/02* (2006.01)
*B60L 3/00* (2006.01)
*B60L 3/12* (2006.01)
*B60L 11/14* (2006.01)
*B60L 15/20* (2006.01)

(52) U.S. Cl.
CPC ....... *B60L 2250/14* (2013.01); *B60L 2250/16* (2013.01); *B60L 2260/44* (2013.01)

(56) References Cited

U.S. PATENT DOCUMENTS

| | | |
|---|---|---|
| 2010/0324846 A1 | 12/2010 | Marsh et al. |
| 2013/0027048 A1 | 1/2013 | Schwarz et al. |
| 2013/0134940 A1* | 5/2013 | Tominaga ........... B60L 11/1846 320/109 |
| 2016/0047862 A1* | 2/2016 | Shimizu ............. G01R 31/3648 702/63 |

* cited by examiner

SMART ENERGY MANAGEMENT TO IMPROVE ELECTRIFIED VEHICLE BATTERY LIFE

TECHNICAL FIELD

This application is generally related to charging lithium-ion based traction batteries.

BACKGROUND

Batteries for electric and plug-in hybrid vehicles are charged between uses to restore energy to the battery for the next use cycle. A vehicle may be connected to a charger that is connected to a power source. The charger is controlled to provide voltage and current to the battery to restore energy to the battery. Different charging strategies are utilized to charge the battery in the vehicle. Present charging strategies charge the battery to a full charge level when the charger is connected. Some charging strategies may delay the onset of charging until electricity rates are cheaper.

SUMMARY

A battery charging system includes a charger coupled to a battery of a vehicle and configured to charge and discharge the battery, and a controller programmed to operate the charger based on a state of charge of the battery to, during a storage duration, maintain the state of charge at a partial charge level, and to, upon expiration of the storage duration, maintain the state of charge at an operating charge level. Operating the charger may include charging and discharging the battery. The controller may be further programmed to communicate with a device remote from the charger via a communications network and wherein the controller receives the storage duration from the device via the communications network. The controller may be further programmed to receive an input indicative of a next usage time, and wherein the storage duration is derived from the next usage time. The partial charge level may be less than the operating charge level. The storage duration may be based on historical drive cycle data of the vehicle. The partial charge level may be a charge level that reduces an amount of degradation to the battery relative to the operating charge level for a same duration of time. The operating charge level may be based on historical drive cycle data of the vehicle. The operating charge level may correspond to a battery state of charge of one hundred percent.

A vehicle includes a traction battery, and a controller programmed to, in response to being coupled to a charger, output a partial charge level, a state of charge (SOC) of the traction battery, and a storage duration that is based on historical drive cycle data, for operating the charger to maintain the SOC of the traction battery at the partial charge level for the storage duration. The controller may be further programmed to output an operating charge level for operating the charger to maintain the SOC at the operating charge level upon expiration of the storage duration. The operating charge level may be based on the historical drive cycle data. The partial charge level may be less than the operating charge level. The storage duration may be based on an expected time of a next trip and a charging time. The partial charge level may be a charge level that reduces an amount of degradation to the battery relative to an operating charge level for a same duration of time.

A method of charging a battery of a vehicle includes maintaining, by a controller, a state of charge of the battery at a partial charge level for a storage duration by charging and discharging the battery. The method further includes increasing, by the controller, the state of charge of the battery to an operating charge level upon expiration of the storage duration by charging the battery. The operating charge level and the storage duration may be based on historical drive cycle data of the vehicle. The method may further include receiving, by the controller, the storage duration from an external network. The method may further include receiving, by the controller, the storage duration, the partial charge level, and the operating charge level from the vehicle when the controller is coupled to the vehicle. The partial charge level may be a charge level that reduces an amount of degradation to the battery relative to the operating charge level for a same duration of time.

The system and method described herein improves battery life and may result in longer intervals between battery servicing and/or replacement. The battery state of charge for vehicle storage intervals is selected to maximize the life of the battery. Battery life is improved without affecting vehicle range and drivability since the battery is charged to the operating charge level prior to vehicle usage. In some configurations, the system includes the ability to remotely communicate with the charging system in order to modify the storage duration and receive status information.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
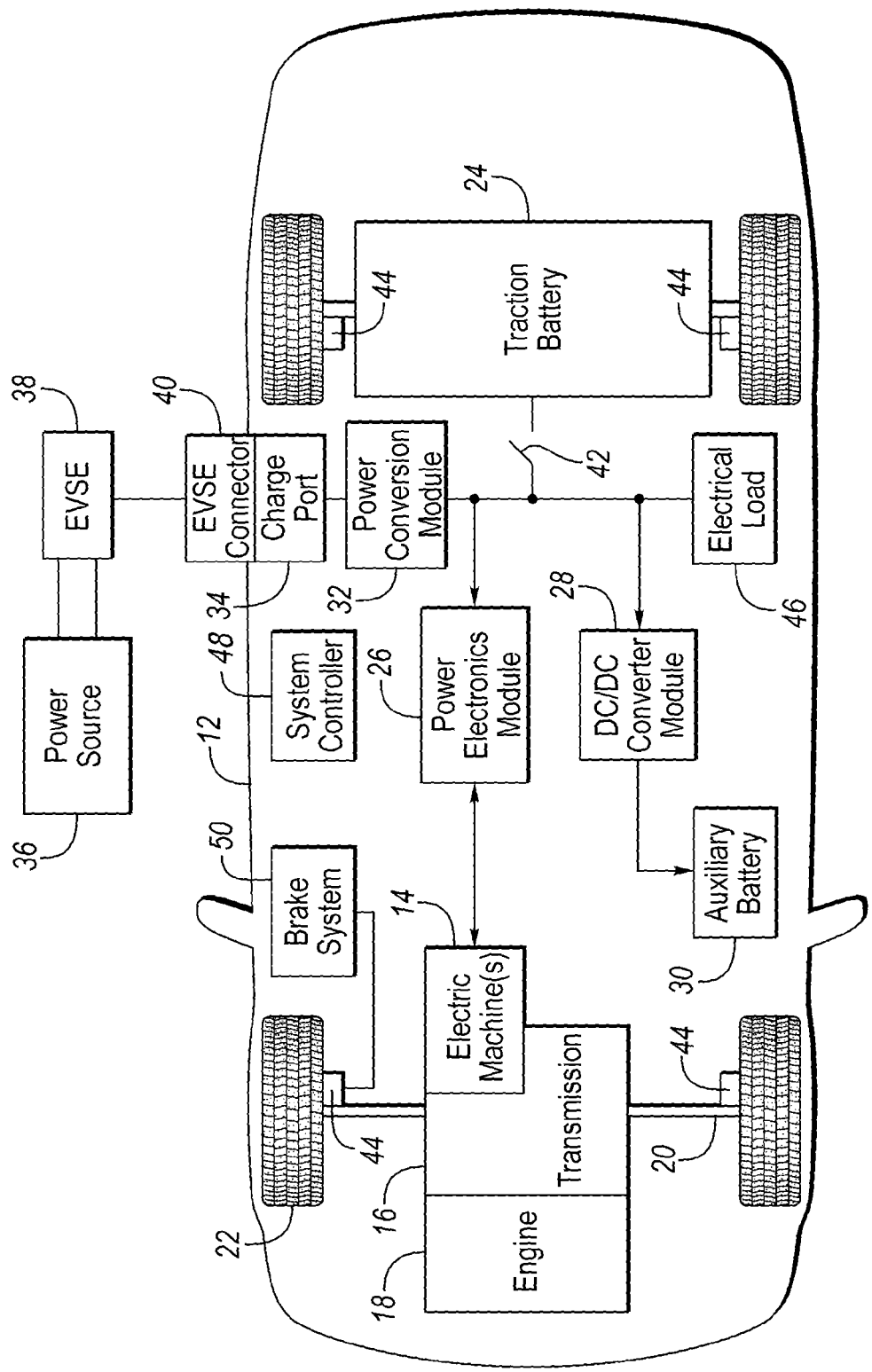
FIG. 1 is a diagram of a hybrid vehicle illustrating typical drivetrain and energy storage components.

FIG. 1 depicts a typical plug-in hybrid-electric vehicle (PHEV). A plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate with a three-phase AC current. The power electronics module 26 may convert the DC voltage to a three-phase AC current to operate the electric machines 14. In a regenerative mode, the power electronics module 26 may convert the three-phase AC current from the electric machines 14 acting as generators to the DC voltage of the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be coupled to an auxiliary battery 30 (e.g., 12V battery). The low-voltage systems may be electrically connected to the auxiliary battery 30. Other high-voltage loads 46, such as compressors and electric heaters, may be coupled directly to the high-voltage output of the battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to an on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the associated components. The controllers may communicate via a serial bus (e.g., Controller Area Network (CAN)) or via discrete conductors. In addition, a system controller 48 may be present to coordinate the operation of the various components.

Figure 2:
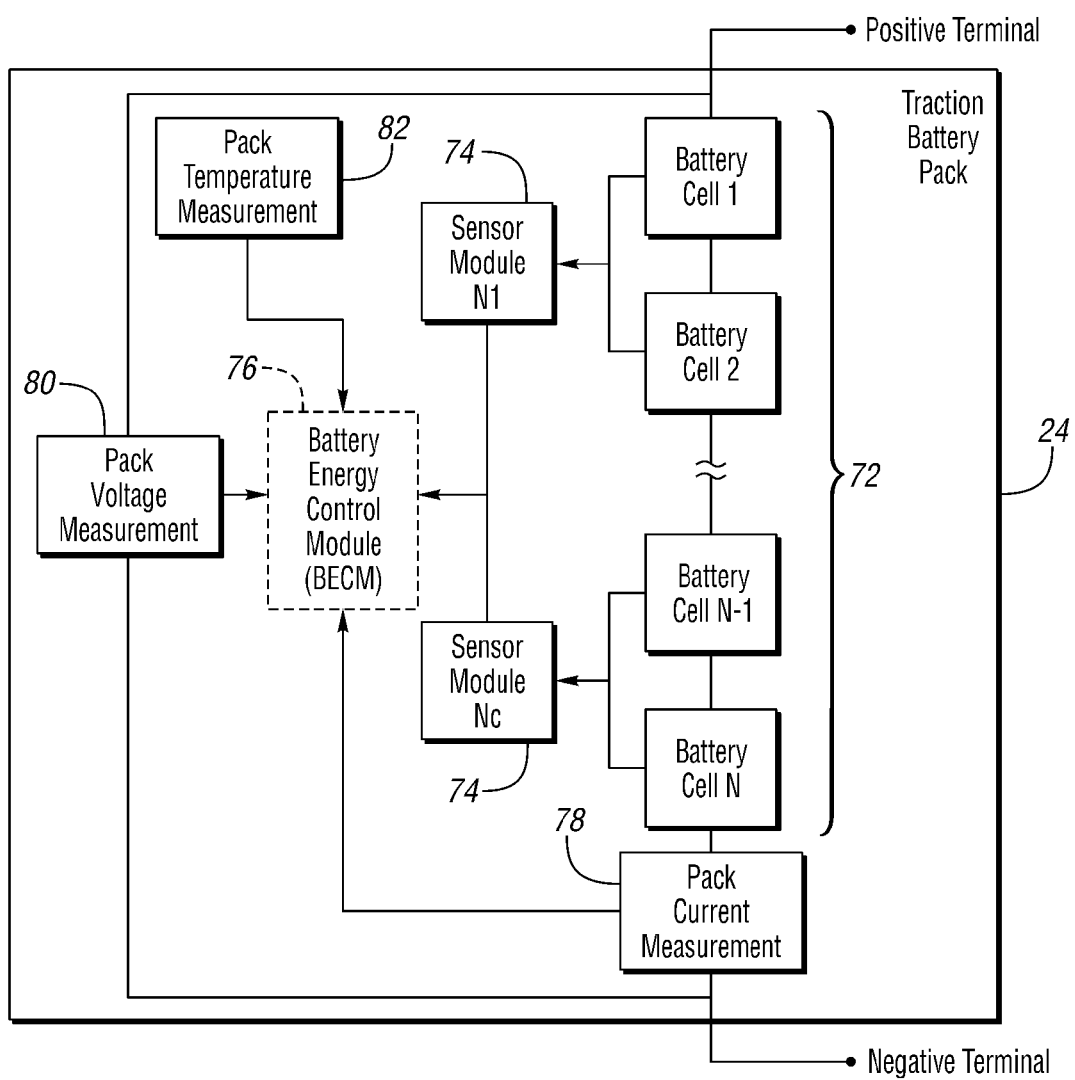
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other configurations, however, may be composed of any number of individual battery cells connected in series or parallel or some combination thereof. A battery system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and pack temperature sensors 82. The BECM 76 may include a non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows electrical loads to be managed such that the power requested is within limits that the battery can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration.

Lithium ion batteries may experience accelerated degradation when maintained at a relatively high SOC. That is, a lithium ion battery that maintains a SOC near a fully charged level (e.g., near 100%) may experience a reduction in battery life. Battery degradation may occur when the vehicle is inactive for long periods of time while maintaining a relatively high battery SOC. An example of such a situation may be a case in which a battery-powered vehicle is parked at an airport while the operator is travelling. The battery-powered vehicle may be placed on a charger 38 during the trip and the battery SOC may be maintained at a high level. During such a scenario, unnecessary battery degradation occurs because the vehicle is not utilized during this time. Alternatively, if the vehicle is not placed on a charger during the trip, there is a risk that the battery may discharge to a SOC level that is too low and the vehicle may not be appropriately charged when the operator returns. The need for a fully charged battery and a desire to increase battery life may be balanced using the system and method described herein.

Figure 3:
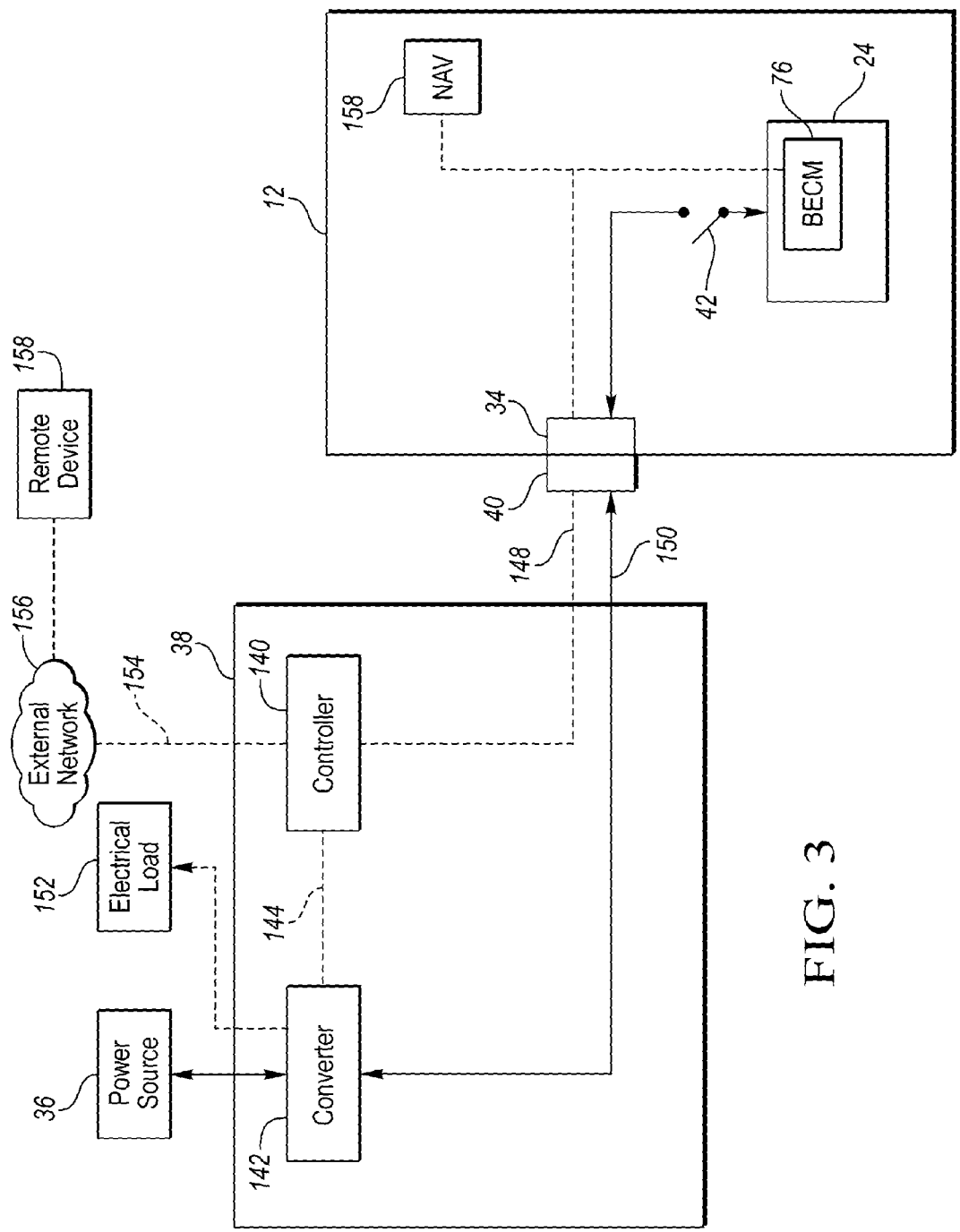
FIG. 3 is a diagram of an exemplary battery charging system.

FIG. 3 depicts a diagram of an exemplary structure for a battery charging system. The EVSE 38 may include a bi-directional AC/DC converter 142. The converter 142 may be electrically connected to the power source 36. The converter 142 may optionally be electrically connected to an electrical load 152. The converter may conduct electric power to and from the battery 24 via one or more power lines 150. The EVSE 38 may include an EVSE controller 140 for managing operation of the EVSE 38. The EVSE controller 140 may interface with the converter 142 through one or more converter control lines 144. The EVSE controller 140 may also be connected to an external network 156 through one or more network interfaces 154. The network interfaces 154 may be wired or wireless. The EVSE 38 and vehicle 12 may include a transceiver or other interface for connecting to the communication network 156 (e.g., wi-fi, cellular phone data network).

The EVSE 38 may have distinct modes of operation. A first mode may be a mode of operation to charge the battery 24 to a partial charge level for storage. A second mode may be a mode of operation to discharge the battery 24 to the partial charge level for storage. A third mode may be a mode of operation to maintain the battery SOC at the partial charge level. A fourth mode may be a mode of operation to charge the battery 24 to an operating charge level for usage. A fifth mode of operation may be a mode of operation to maintain the battery SOC at the operating charge level while awaiting an impending operator usage.

The EVSE 38 may discharge the battery 24 by returning battery energy to the electrical grid or power source 36. In some configurations, the EVSE 38 may include a connection to external devices to power external loads 152. For example, when connected to the charger 38 at home, devices within the home may be powered by energy from the battery 24. In some configurations, the EVSE 38 may interface with other electrical loads 46 within the vehicle 12 to discharge energy from the battery 24. For example, energy may be provided to a heating and cooling module to maintain the battery 24 or other vehicle components at a predetermined temperature.

The EVSE controller 140 may also communicate with the BECM 76 via one or more battery interface lines 148. The EVSE controller 140 and the BECM 76 may exchange data and control information over the battery interface lines 148.

The battery 24 may be maintained at the partial charge level during periods of inactivity and brought to the operating charge level immediately prior to use. The partial charge level may be optimized to improve battery life during periods of storage or non-use. The partial charge level may vary depending upon the particular battery chemistry and architecture. For example, for a lithium-ion battery, a partial charge level of approximately 50% may be selected. Further, the operating charge level may be a SOC level that is appropriate for the intended usage. That is, the operating charge level is not necessarily a full charge level.

The BECM 76 may store information including the partial charge level and the operating charge level. When the traction battery 24 is coupled to the EVSE 38, the information may be communicated to the EVSE controller 140.

In some configurations, the battery charging system may learn operator driving patterns based on historical drive cycle data. The vehicle 12 may include a navigation system 158 that includes a vehicle location function. The navigation system 158 may provide route information to the operator. The navigation system 158 may periodically store vehicle position, date/time, and route data for later analysis. The navigation system may include a vehicle position sensor (e.g., Global Positioning System (GPS) receiver). The navigation system 158 may communicate the vehicle position, date/time and route data to the BECM 76 and/or the EVSE controller 140. The EVSE controller 140 may store vehicle position data as starting and ending points to determine the operating charge level for the expected usage.

Historical drive cycle data may include a starting location and a destination location. The historical drive cycle data may include a travel time between locations and a distance between locations. The historical drive cycle data may also include a starting and ending time for trips between the locations. The historical drive cycle data may be analyzed to determine future driving patterns. For example, an operator may drive the same route to work at the same time on weekdays. This pattern may be recognized by the battery charging system. Data retained by the battery charging system may be the amount of charge necessary for the trip (one-way or round) and the time at which the charge is to be completed. The operator may place the vehicle 12 on the charger 38 at a charging location.

The battery charging system may monitor the SOC level of the battery 24 and initially charge or discharge the battery 24 to the partial charge level during a storage period. The partial charge level may be battery specific and may be selected to improve battery life. During the storage period, the battery charging system may maintain the SOC at the partial charge level. The battery charging system may determine an amount of time required to charge the vehicle from the partial charge level to the operating charge level for the expected usage. The battery charging system may charge the battery starting at a predetermined time before the expected usage time to ensure that the battery is charged to the operating charge level at the expected usage time.

The battery charging system may determine a storage duration for the vehicle 12. The storage duration may be an amount of time that the vehicle 12 will remain unused and preferably charged to the partial charge level. The storage duration may be derived from an operator input or from historical drive cycle data.

In some configurations, a user interface may be provided so that the operator may enter quantities such as the storage duration and the expected usage time. The user interface may be configured to allow the operator to input the partial charge level and the operating charge level. The user interface may include a display. The display may be a touch screen configured to allow the operator to input data. The user interface may also include a keyboard, keypad, push buttons, and knobs. The user interface may be included as part of the navigation system 158. In some configurations, the user interface may be included on an external device 158 that communicates over the network 156.

For example, the operator may interact with the user interface and directly enter a storage duration that is the amount of time to maintain the partial charge level. The actual form of the input may be an absolute time or a relative time. Upon expiration of the storage duration, the battery charging system may charge the battery 24 to the operating charge level.

In some configurations, the operator may input a time at which the vehicle is expected to be operated (e.g., expected usage time) from which the storage duration may be indirectly obtained. The storage duration may be determined as the difference in time between the expected usage time and the amount of time to charge the battery from the partial charge level to the operating charge level.

The expected usage time and storage duration may also be derived from historical driving patterns. Repetitive trips from a first location to a second location may be learned over time. For example, each weekday, the operator may drive from home to work at approximately the same time in the morning. This may be followed by driving from work to home at a consistent time of day. Upon arriving back at home, the operator may charge the vehicle. This pattern may be learned and recognized. The battery charging system may learn an operating charge level to complete the round trip such that the vehicle returns home at an acceptable battery charge level. The acceptable battery charge level may be the partial charge level.

For example, the battery charging system may learn that the round trip requires approximately 30% SOC to complete. Assuming a partial charge level of 50%, the operating charge level may be set to 80%. Upon completing the round trip, the vehicle would arrive home with a 50% charge level. When placed on the charger, the battery charging system may determine a charging time as the amount of time required to charge the battery from 50% to 80%. The battery charging system may determine the next usage time from the historical drive cycle data or user input. The battery SOC may be maintained at 50% from the time the charger is plugged in until the charging time. At the charging time, the battery may be charged up to 80%. If the predicted times are correct, the operator drives the vehicle soon after it is charged to 80%. The battery charging system may include additional increments of SOC and charging time to account for variations in the operator schedule. One skilled in the art can determine other similar scenarios and program the battery charging system to respond accordingly.

There may be situations in which the operator may want to change previously entered values. For example, an operator may be delayed in retrieving a vehicle that is parked at an airport. In such a case, the operator may desire to communicate an updated return time to the battery charging system in order to maximize battery life. In addition to delays, the system may be configured to handle an early return. The operator may be expecting to return at an earlier time or desires to use the vehicle on short notice. In these situations, the operator may desire to initiate charging immediately. The operator may communicate an override command via the user interface to commence charging immediately.

The EVSE 38 may receive and transmit data over the communication network 156. The operator may communicate with the battery charging system over the network 156. The operator may utilize a remote device 158 to interface with the network 156. The remote device 158 may be a cell phone or tablet that is executing an application for interfacing with the charging system. In some configurations, a web-based application executed on a computing device may be utilized to provide the interface to the charging system. For example, the remote device interface may allow the operator to send an updated expected usage time to the battery charging system. The expected usage time may be an anticipated date and time at which the operator expects to disconnect the charger and perform a drive cycle. The battery charging system may communicate a present battery SOC to the remote device 158 over the network 156. In addition, the operator may maintain a calendar or schedule in the remote device 158 that includes the battery charging system user interface. The charging system application may link to the calendar to determine usage times and expected destinations which may be communicated with the battery charging system via the network 156.

Figure 4:
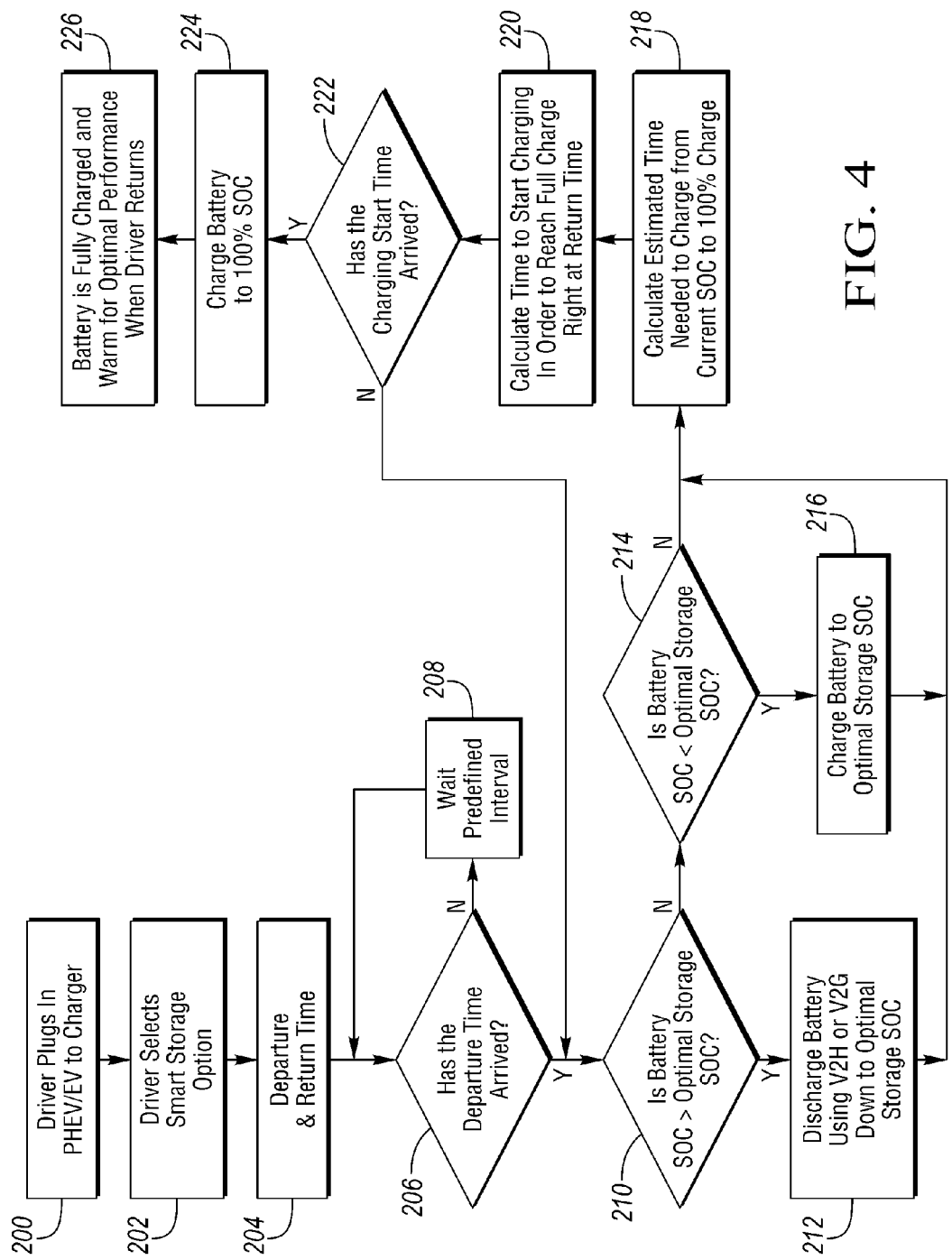
FIG. 4 is a flow chart for an exemplary sequence of operations for realizing the battery charging system.

FIG. 4 depicts a flow chart of possible operations for implementing the battery charging system as described herein. The operations may be performed in one or more of the EVSE controller 140 and the BECM 76. The sequence may begin with operation 200 in which a driver couples the EVSE 38 to the vehicle 12. In operation 202, the driver may, through the user interface, select a smart storage option. In operation 204, the driver may input a departure and return time. The departure and return time may correspond to a flight or other mode of travel. It may be anticipated that the vehicle is not needed for usage from the departure time until the return time.

At operation 206, the battery charging system may compare the present time to the departure time to determine if the departure time has arrived. If the departure time has not arrived, operation 208 may be performed in which the battery charging system waits for a predefined interval before checking again. If the departure time has arrived, operation 210 may be executed to check if the battery SOC is greater than the partial charge level (e.g., optimal storage SOC). If the battery SOC is greater than the partial charge level, operation 212 may be performed to discharge the battery to the partial charge level. The battery may be discharged by providing energy from the vehicle to the electrical grid 36 (V2G) or by providing energy from the vehicle to a home-based electrical load (V2H) 152. If the battery SOC is less than the partial charge level, then operation 214 may be performed to check if the battery SOC is less than the partial charge level. If the battery SOC is less than the partial charge level, then operation 216 may be performed to charge the battery to the partial charge level.

At operation 218, an estimated time to charge from the present SOC to the operating charge level may be calculated. At operation 220, the time to start charging to reach the operating charge level at the return time may be calculated. At operation 222, a check is performed to determine if the charging start time has arrived. If the charging start time has arrived, operation 224 may be performed in which the battery is charged to the operating charge level. If the charging start time has not arrived, execution may transfer back to operation 210 to continue monitoring the battery SOC. Execution may end at operation 226 in which the battery is charged to the operating charge level and ready for the driver to arrive. Note that the flow chart depicts an operating charge level of 100%, but other charge levels may be selected.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery charging system comprising:
    a charger coupled to a battery of a vehicle and configured to charge and discharge the battery; and
    a controller programmed to charge and discharge the battery based on a state of charge of the battery to, during a storage duration, maintain the state of charge at a predetermined partial charge level, and to, upon expiration of the storage duration, maintain the state of charge at an operating charge level.

2. The battery charging system of claim 1 wherein the controller is further programmed to communicate with a device remote from the charger via a communications network and wherein the controller receives the storage duration from the device via the communications network.

3. The battery charging system of claim 1 wherein the controller is further programmed to receive an input indicative of a next usage time, and wherein the storage duration is derived from the next usage time.

4. The battery charging system of claim 1 wherein the predetermined partial charge level is less than the operating charge level.

5. The battery charging system of claim 1 wherein the storage duration is based on historical drive cycle data of the vehicle.

6. The battery charging system of claim 1 wherein the predetermined partial charge level is a charge level that reduces an amount of degradation to the battery relative to a present charge level for a same duration of time.

7. The battery charging system of claim 1 wherein the operating charge level is based on historical drive cycle data of the vehicle.

8. The battery charging system of claim 1 wherein the operating charge level corresponds to a battery state of charge of one hundred percent.

9. A vehicle comprising:
    a traction battery; and
    a controller programmed to, in response to being coupled to a charger, output a predetermined partial charge level, a state of charge (SOC) of the traction battery, and a storage duration that is based on historical drive cycle data, for operating the charger to maintain the SOC at the predetermined partial charge level during the storage duration by charging and discharging the traction battery.

10. The vehicle of claim 9 wherein the controller is further programmed to output an operating charge level for operating the charger to maintain the SOC at the operating charge level upon expiration of the storage duration.

11. The vehicle of claim 10 wherein the operating charge level is based on the historical drive cycle data.

12. The vehicle of claim 10 wherein the predetermined partial charge level is less than the operating charge level.

13. The vehicle of claim 9 wherein the storage duration is based on an expected time of a next trip and a charging time.

14. The vehicle of claim 9 wherein the predetermined partial charge level is a charge level that reduces an amount of degradation to the traction battery relative to a present charge level for a same duration of time.

15. A method of charging a battery of a vehicle, the method comprising:
- maintaining, by a controller, a state of charge of the battery at a predetermined partial charge level for a storage duration by charging and discharging the battery; and
- increasing, by the controller, the state of charge of the battery to an operating charge level upon expiration of the storage duration by charging the battery.

16. The method of claim 15 wherein the operating charge level and the storage duration are based on historical drive cycle data of the vehicle.

17. The method of claim 15 further comprising receiving, by the controller, the storage duration from an external network.

18. The method of claim 15 further comprising receiving, by the controller, the storage duration, the predetermined partial charge level, and the operating charge level from the vehicle when the controller is coupled to the vehicle.

19. The method of claim 15 wherein the predetermined partial charge level is a charge level that reduces an amount of degradation to the battery relative to a present charge level for a same duration of time.

* * * * *